Aug. 16, 1955     W. L. BIRCH     2,715,287
EASEL STAND PICTURE FRAME
Filed Feb. 19, 1951
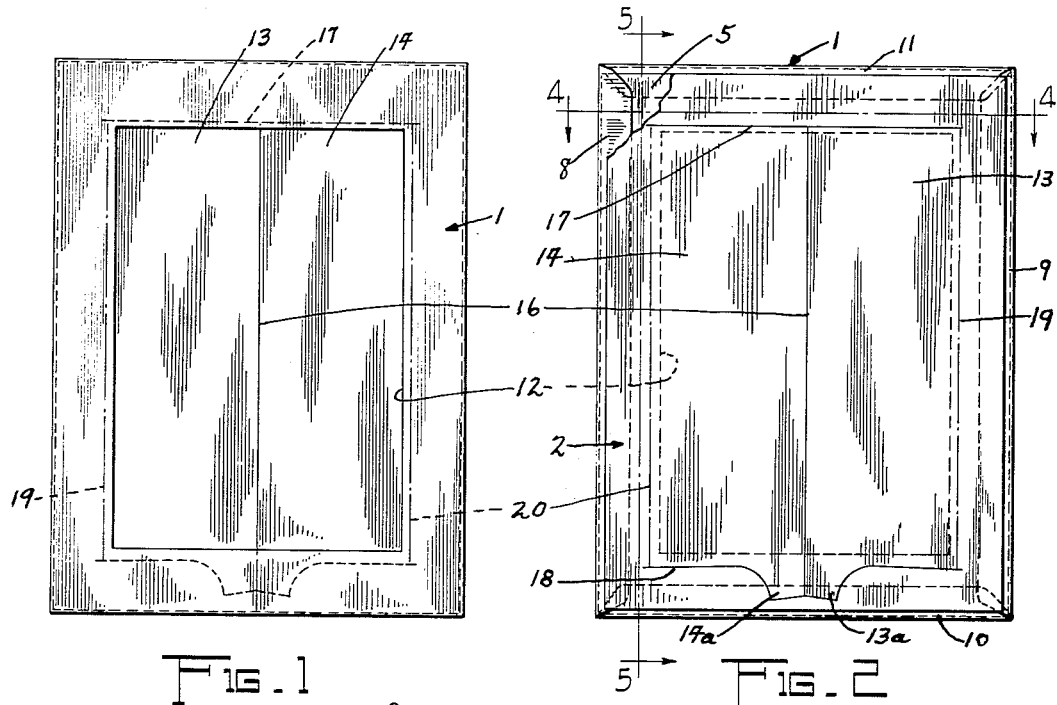
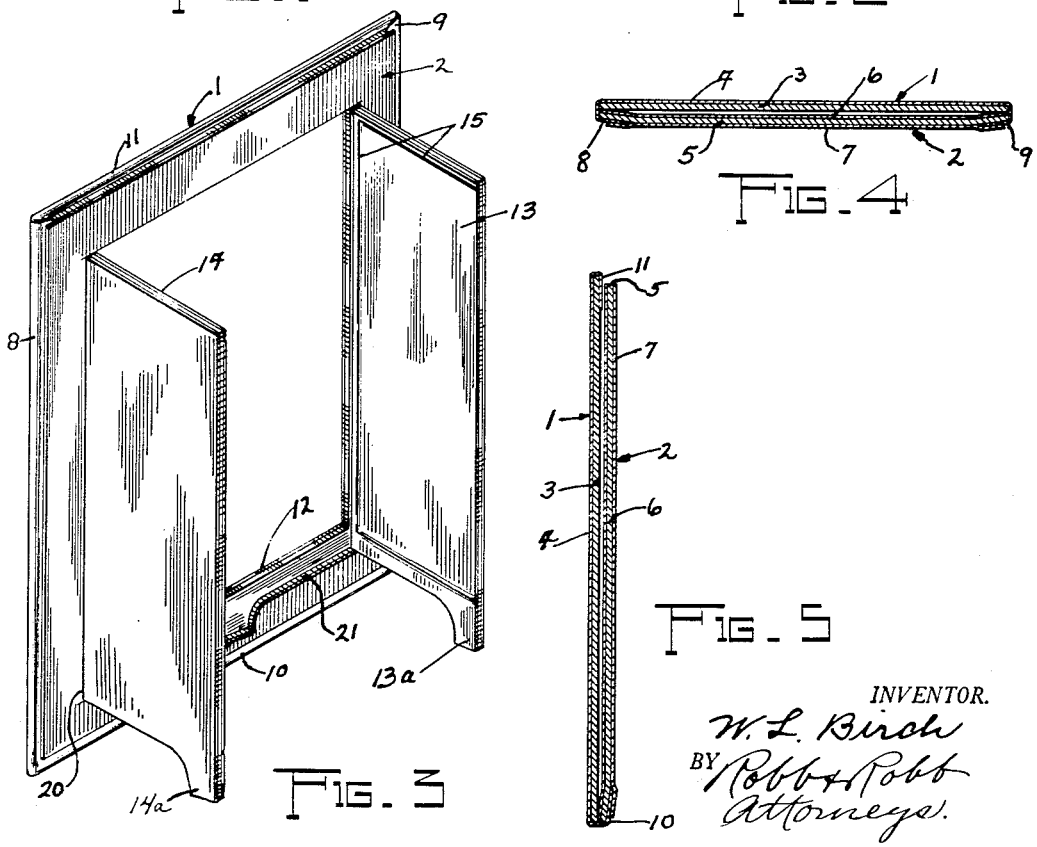
INVENTOR.
W. L. Birch
BY Robb & Robb
Attorneys.

United States Patent Office 2,715,287
Patented Aug. 16, 1955

2,715,287
EASEL STAND PICTURE FRAME
William L. Birch, East Cleveland, Ohio Application February 19, 1951, Serial No. 211,673

4 Claims. (Cl. 40—152.1)

My present invention comprises a novel easel stand picture frame and novel method of making the same, the device of my invention being designed particularly for displaying or exhibiting photographic portraits in upright position on a desk or table or the like.

A primary object of my invention is to provide an easel type picture frame designed especially for the purpose above indicated, which is of relatively simple construction and which makes novel provision for lighting of the picture to be displayed thereby.

Another object of my invention is to provide an easel type picture frame wherein the easel stand element or elements are formed integrally with the frame unit or one portion thereof and wherein the frame unit is so designed that when the easel stand element or elements are manipulated to dispose the same in condition for supporting the frame unit in upright condition upon a supporting surface, light is admitted at the rear of the picture carried by the frame unit to light the same and enhance the effectiveness of the picture when viewed from the front of the frame unit.

A further object of my invention is to provide an easel type frame of the character referred to wherein the formation of the easel stand element or elements is such that when such element or elements are manipulated to dispose the same in condition for supporting the frame unit upon a supporting surface, this action serves to provide an opening at the rear of the frame for the admission of light to the picture carried thereby, at the rear of said picture.

Another object of my invention is to provide a novel easel type picture frame in which the formation of the easel stand element or elements serves to provide an opening at the rear of the frame for the admission of light to the rear of a picture carried by such frame.

Still a further object of my invention is to provdie a simple method of constructing an easel type picture frame in which light is admitted to the rear of a picture carried by such frame.

In carrying my invention to practice, I provide a picture frame unit comprising a front frame member and a rear frame member, each comprising a flat sheet of material of substantially the same size and which may consist of any suitable material such as cardboard or the like. The two frame members are disposed in face to face relation and secured together only at marginal edge portions thereof, the remaining portions of the frame members being unconnected whereby a picture sheet may be received between and retained and clamped between the frame members. The front frame member has a central opening therethrough through which a picture sheet received between the frame members may be viewed. The rear frame member has a portion thereof partially severed therefrom to provide an opening through the rear frame member in at least partial register with the opening through the front frame member, the severed portions forming an easel flap or stand element hinged to the rear frame member at the unsevered portion and hingedly movable at its line of juncture with the rear frame member out of the plane of the latter to dispose the easel flap or stand element in condition for supporting the frame unit in upright position upon a supporting surface.

In accordance with the invention, the frame unit preferably embodies two easel flap or stand elements formed out of the body of the rear frame member and arranged to hinge about lines of juncture disposed adjacent opposite edges of the opening through the front frame member.

Other objects, advantages, and features of invention will become apparent from the following detail description taken in conjunction with the accompanying drawings, in which:

Figure 1 is a front elevation of the picture frame unit of the invention showing the same in its initial flat condition before the easel stand or flap elements have been moved out of the plane of the rear frame member.

Figure 2 is a rear elevational view of the same unit in the same condition as in Figure 1.

Figure 3 is a perspective view of the frame unit showing the same in its condition with the easel flap or stand elements moved out of the plane of the rear frame member to the positions which they assume for supporting the frame unit in upright condition on a supporting surface.

Figure 4 is a sectional view taken substantially on the line 4—4 of Figure 2.

Figure 5 is a sectional view taken substantially on the line 5—5 of Figure 2.

Now referring to the drawing and describing the invention in detail, the frame unit illustrated comprises a front frame member generally designated by the numeral 1 and a rear frame member generally designated by the numeral 2. The frame members 1 and 2 are substantially the same size in overall dimensions. Each of the frame members 1 and 2 is formed from a flat sheet of suitable resilient and preferably relatively flexible material and each frame member may include a cover sheet suitably secured to either or both of its flat surfaces. In the specific embodiment illustrated, it will be noted that the frame member 1 consists of a flat sheet of material designated 3, which is a suitable resilient and preferably flexible material, preferably a material such as cardboard or the like which has these characteristics and yet which is sufficiently stiff as to normally retain its flat condition. The frame member 1 is further provided with a cover sheet designated 4 which may be suitably decorated or embossed and which may comprise a paper sheet preferably of fairly heavy weight and strength, especially where the paper cover sheet is availed of for attaching the two frame members 1 and 2 together in the manner hereinafter described.

Similarly, the frame member 2 comprises a flat sheet of material designated 5 corresponding to the sheet of material 3 of the frame member 1 and the frame member 2 is provided with a front cover sheet 6 and a rear cover sheet 7 which may be of the same material as the cover sheet 4 of the frame member 1. It will be noted that the paper cover sheet 4 of the frame member 1 has side flap portions 8 and 9 extending beyond the periphery of the sheet material 3 and these flap portions 8 and 9 are folded over onto the rear face of the rear frame member 2 and pasted or otherwise suitably secured thereto. Also, the cover sheet 4 of the front frame member 1 includes a bottom flap portion 10 which is similarly folded over onto the rear face of the frame member 2 and suitably secured thereto. The frame members 1 and 2 will, of course, have been first disposed in face to face aligned relation as shown in the drawings prior to the folding over and securing of the flap portions 8, 9, and 10, in the manner described. Thus the flap portions 8, 9, and 10, serve to secure the frame members 1 and 2 together. When the flap members 8, 9, and 10, have been folded over onto the frame member 2 and secured thereto, the cover sheet 7 may then be pasted or otherwise secured to the rear face of the frame member 2 in a manner to overlie the flaps 8, 9, and 10, as shown.

It will be noted that the flap portion 11 of the cover sheet 4 which extends beyond the periphery of the sheet 3 of the frame 1 at the upper edge thereof, is not folded over onto the rear frame member 2 but is folded over onto the rear face of the front frame member 1 and secured thereto. Thus it will be noted that the frame members 1 and 2 are secured together only at their marginal edge portions and the marginal edge portions of the frame members so secured extend around three sides of the frame unit or substantially around the entire periphery of the frame unit with the exception of the upper side and the frame members 1 and 2 are not connected together except as noted. The distance at the upper edge of the frame unit along which the frame members 1 and 2 are unsecured, is substantially equal to one dimension of a picture sheet which is to be received in the frame unit whereby the picture sheet may be inserted between the frame members 1 and 2 at the upper unsecured edge portions of the frame members so that the picture sheet will be received within the confines of the marginal edges of the frame unit in such a manner that the picture on the picture sheet may be viewed through the central opening 12 provided in the front frame member 1. When the picture sheet is so received between frame members 1 and 2, it will be retained between said frame members by the slight clamping or frictional engagement of said frame members with the picture sheet.

It may be noted that while the front and rear frame members 1 and 2 are substantially the same size, it is preferable that the rear frame member be of slightly less vertical dimension so that when the frame members are secured together with the lower edges substantially flush, the upper edge of the rear frame member 2 will be slightly lower than the upper edge of the frame member 1 so as to facilitate slight separation of the frame members at the upper edge of the unit by manual operation when inserting the picture sheet between the frame members.

The central opening 12 in the front frame member 1 may be formed by a die cutting operation performed after the frame members 1 and 2 have been secured together in the manner above described. In this die cutting operation the cutting die may be moved in a direction toward the front face of the front frame member 1 and after cutting completely through the body of the front frame member 1 the cutting edge of the die may be allowed to cut slightly into the rear frame member 2 to leave a light line impression or score line in the latter around the periphery of the opening 12. This will produce a decorative score line on one face of each of the easel flap or stand elements 13 and 14 which are formed in the manner now to be described. The decorative score line produced by the die cutting operation forming the opening 12 in the front frame member 1 is indicated by the numeral 15 as it appears in Figure 3 on the easel flap or stand element 13.

After the die cutting operation forming the opening 12 in the frame member 1, portions of the rear frame member 2 are severed by a similar die cutting operation to form the easel flap or stand elements 13 and 14. In the latter operation the rear frame member 2 is cut completely through along a vertical line indicated by the numeral 16 extending from a point adjacent the top edge of the opening 12 to the lower edge or somewhat below the lower edge of the opening 12. The rear frame member 2 is also cut completely through along a horizontal line 17 adjacent to or slightly above the top edge of the opening 12. The rear frame member 2 is also cut along a line indicated by the numeral 18 adjacent to or slightly below the opening 12 and extending substantially from one side edge to the other side edge of the opening 12. The line of severance 17 likewise extends substantially from one side edge to the other side edge of the opening 12. As illustrated, the lines of severance 17 and 18 may in fact extend slightly beyond the side edges at either side of the opening 12. The lines of severance 16, 17, and 18, sever the easel flap or stand element portions 13 and 14 from one another and from the main body of the frame member 2 partially though the easel flap or stand elements 13 and 14 remain unsevered from the frame member 2 adjacent the side edges of the opening 12 and thus the easel flap or stand elements 13 and 14 are hinged to the frame member 2 adjacent to the side edges of the opening 12 similar to vertically hinged swinging doors pivoted at their outer edges. The line of juncture or hinge portion of the easel flap or stand element 13 with the body of the frame member 2 is indicated by the numeral 19 and the line of juncture or hinge portion of the flap or stand element 14 with the main body of the frame member 2 is indicated by the numeral 20.

The easel flap or stand elements 13 and 14 are bent relative to the body of the frame member 2 for hinge movement about their lines of juncture 19 and 20 out of the plane of the body of the frame member 2 so as to dispose the elements 13 and 14 in position such as illustrated in Figure 3 for supporting the frame unit in upright condition with the lower edge of the frame and the lower edges of the easel flap or stand elements 13 and 14 resting upon a supporting surface. It may be noted in this connection that the line of severance 18 is such as to provide the formation of the bottom extension or foot portions 13a and 14a on the elements 13 and 14 respectively, at locations remote from each line 19 and 20, connecting elements 13 and 14 to the main body of the frame member 2.

The cutting of the frame member 2 completely through along the lines 16, 17, and 18, for partial severance of the elements 13 and 14 from the main body of the frame member 2 serves, when the elements 13 and 14 are hingedly moved out of the plane of the body of the rear frame member 2, to form an opening 21 through the rear frame member which opening 21 is in at least partial register with the opening 12 through the frame member 1. As illustrated in the drawings, the lines of severance 17 and 18 may be respectively above and below the upper and lower edges of the opening 12 and the lines of juncture 19 and 20 may be slightly outside of the side edges of the opening 12.

In the use of the device of my invention, it will be apparent that the frame unit having the cut out opening 12 formed in the frame member 1 and the frame member 2 having the flap or stand elements 13 and 14 partially severed from the body thereof, may be shipped and stored in flat condition with the flap or stand elements 13 and 14 disposed in the plane of the body of the frame member 2, as illustrated in Figures 1 and 2. When it is desired to employ the frame unit for display of the picture, the flap or stand elements 13 and 14 will be hingedly moved out of the plane of the body of the frame member 2 and disposed in position such as illustrated in Figure 3 for supporting the frame unit in upright condition. A picture sheet may then be inserted through the unsecured space between the frame members 1 and 2 at the upper edge of the unit so that the picture sheet is received between the frame elements 1 and 2 and clampingly retained therebetween in such a manner that the picture on the picture sheet may be viewed from the front of the unit through the opening 12. When the picture is so displayed with the easel flap or stand elements disposed as illustrated in Figure 3, the opening 21 through the rear frame member 2 in at least partial register with the opening 12 through the frame member 1, admits light to the rear of the picture sheet which serves to illuminate the picture displayed in the frame unit by virtue of the light passing through the picture sheet, when the picture is viewed from the front of the frame unit through the opening 12. From the foregoing it will be seen that my invention provides a relatively simple construction of frame unit in which the easel stand or flap elements are arranged so that opening thereof out of the plane of the rear frame member 2 to a supporting position, as illustrated in Figure 3, provides registering openings in the frame unit by which a picture displayed thereby is illuminated by light passing through the picture sheet.

Having thus described my invention, what I claim as new and desire to secure by Letters Patent of the United States is:

1. An easel picture frame unit of the class described, comprising a front frame member and a rear frame member, each frame member comprising a flat sheet of material of substantially the same size, said members being disposed in face to face relation and secured together only at certain marginal edge portions thereof, the remaining portions of the frame members being unconnected whereby a picture sheet may be received between and retained clamped between said frame members, the front frame member having a central opening therethrough through which a picture sheet received between the frame members may be viewed, the rear frame member having portions in the plane of the main body thereof partially severed therefrom at the top and bottom edges of said portions and severed from one another vertically so they may swing rearwardly apart to positions at a right angle to the rear frame member to provide an unobstructed light opening through said rear frame member, in register with the opening through the front frame member, the severed portions each forming a respective easel stand element hinged to said rear frame member at the unsevered portions along respective lines of juncture with the rear frame member located adjacent the opposite side edges of the opening through the front frame member, said stand elements being hingedly movable away from one another about said lines of juncture out of the plane of said rear frame member to dispose said stand elements in condition for supporting the frame unit in upright condition.

2. An easel picture frame unit as claimed in claim 1 wherein said elements are formed with foot extensions extending downwardly from said elements and disposed adjacent to the line of severance between said stand elements.

3. An easel picture frame unit as claimed in claim 1 wherein the front frame member is die-cut to provide a central opening therethrough and the rear frame member is scored around the periphery of said opening by the cutting die in the formation of said central opening.

4. An easel picture frame unit comprising a front frame member and a rear frame member, each comprising a flat sheet of material of substantially the same size, said members being disposed in contact face to face and secured together at certain marginal edge portions, remaining edge portions being unconnected, whereby a picture sheet may be inserted between the frame members through the unconnected edge portions, the front frame member being cut out to provide an opening through which a picture sheet received between the frame members may be viewed, the rear frame member being severed horizontally at the top and bottom portions thereof about in line with the upper and lower edges of the front frame opening, and being also severed vertically along a line vertically medial of said front frame opening, and the portions of the rear frame member at opposite sides of said medial line being swung rearwardly on lines substantially parallel with the side edges of the front frame opening, at which lines the severed portions of the rear frame member are hingedly connected to the body portion of the latter, thereby to assume positions at a right angle to the bodies of the two frame members to form a light receiving opening in the rear frame member and provide easel stand supporting elements in positions wholly unobstructive to light directed to the plane of said last opening at right angles thereto, said elements being engageable with a support at the lower rearwardly swung corners thereof to hold the picture frame unit upright.

References Cited in the file of this patent

UNITED STATES PATENTS

| Number | Name | Date |
| --- | --- | --- |
| 246,081 | Caterson | Aug. 23, 1881 |
| 735,486 | Fels | Aug. 4, 1903 |
| 1,638,562 | Cameron | Aug. 9, 1927 |
| 1,669,895 | Blyth | May 15, 1928 |
| 2,209,668 | Thornton | July 30, 1940 |
| 2,443,645 | Turan | June 22, 1948 |
| 2,496,884 | Miles | Feb. 7, 1950 |
| 2,553,174 | Cross | May 15, 1951 |